March 22, 1927.

A. BUTZ 1,621,967

SAFETY PLATE AGAINST BURNING DURING COOKING

Filed Nov. 11, 1924

Inventor
Arthur Butz
By - B. Singer, Atty.

Patented Mar. 22, 1927.

1,621,967

UNITED STATES PATENT OFFICE.

ARTHUR BUTZ, OF HALBAU, SILESIA, GERMANY.

SAFETY PLATE AGAINST BURNING DURING COOKING.

Application filed November 11, 1924, Serial No. 749,350, and in Germany March 12, 1924.

This invention relates to safety plates of the kind which are to be placed in kitchen vessels or the like to prevent burning or sudden overboiling of liquids, especially of milk.

The essential feature of my improved safety plate is that it is constructed as a disc from porcelain, stoneware, or similar material, and is supported on the bottom of the kitchen vessel in which it is used with feet, or preferably with a downwardly extending edge. This plate encloses a small liquid space at the bottom of the vessel. The liquid within this chamber boils quickly, while the remainder of the liquid in the vessel is still below the boiling temperature. As the liquid in the vessel approaches the boiling point, steam ascends from below the plate and makes noise enough to serve as a signal that the temperature is rapidly rising and hence gives the attendant warning to remove the vessel from the fire and prevent boiling over or burning of the contents thereof.

The manufacture of the safety plate from porcelain ensures complete immunity from any attack of the safety plate by chemical influences, and also greatly facilitates the cleaning of the plate.

In a preferred form of the improved safety plate, the same is provided on its under side, facing the bottom of the vessel, with ribs or grooves in the form of circles, or, in particular, spiral ducts. Hereby is effected quick distributing of the vapors arising and hence also the distribution of the heat from one part of the periphery of the plate to the remainder, thus affording uniform heating and corresponding safety against the breaking of the plate, especially if it should be laid unsymmetrically in the vessel so that only certain parts are over the flame and the plate is thus unequally heated at different points. The use of spiral ducts contrasted with circular ducts promotes a very effective whirling motion of the vapors towards the periphery of the plate, from whence they ascend.

The improved safety plate is illustrated in the accompanying drawings, in which—

Figure 1:
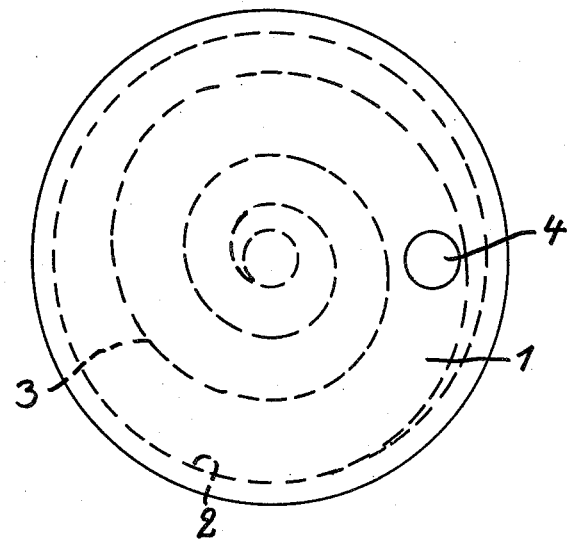
Fig. 1 is a plan.
Figure 2:
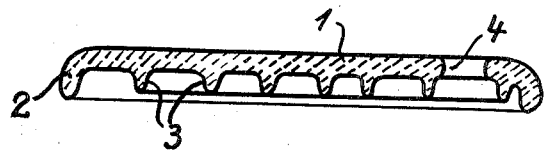
Fig. 2 is a sectional elevation.

Referring to the drawings, the plate 1 when in use, stands with a curved edge portion 2, on the bottom of the kitchen vessel and has on the same side a worm shaped spiral rib 3 extending from the center to the periphery. A hole 4 in the plate 1 provides a free passage for the ascension of the vapors given off and serves at the same time for hanging up the plate on the kitchen rack.

The entire plate is manufactured in one piece from porcelain, stoneware or the like materials, or glass. Glazed porcelain is well suited, because it does not crack and is readily cleaned.

In place of the complete edge portion 2 separate feet may be provided for supporting the plate 1, or the latter can rest on the shaped ribs 3. By the provision of the spirally formed recess on the under side of the plate, a hollow space is provided, which is so far shut off upwardly that vapours can form therein and can only escape upwardly by a sinuous path and accordingly cause strong eddies in the liquid.

The effect is such that the liquid chamber formed under the plate 1 is quickly heated in consequence of the good heat insulating property of the plate, so that the liquid therein boils and the vapours are allowed to ascend through the hole 4 as well as by lifting the plate under its edge 2, whereby the gradual boiling of the whole liquid is started and is made noticeable.

On vigorous boiling setting in, the plate receives a vibrating movement which causes it to stir round in contact with the bottom of a relatively large cooking vessel.

I claim:

1. A device for preventing the boiling over of milk or like fluids, comprising a plate having downwardly extending supporting means on the edge thereof, a spirally formed recess on the lower face of said plate, and a vapor exit connecting the outer end of said recess to the space above said plate.

2. A device for preventing the boiling over of milk or like fluids, comprising a plate having downwardly extending supporting means on the edge thereof, and a spirally formed recess on the lower face of said plate, and also having a perforation near the edge of said plate, and at the end of said spirally formed recess.

3. A device for preventing the boiling over of milk or like fluids, comprising a plate of ceramic material having downwardly extending supporting means on the edge thereof, a spirally formed recess on the lower face of said plate, and a vapor exit connecting the outer end of said recess to the space above said plate.

ARTHUR BUTZ.